(12) United States Patent
Boes

(10) Patent No.: US 8,402,610 B2
(45) Date of Patent: Mar. 26, 2013

(54) DETACHABLE HANDLE

(75) Inventor: Erwin Petrus Boes, Wijchen (NL)

(73) Assignee: Product Works Limited (HK)

( * ) Notice: Subject to any disclaimer, the term of this patent is extended or adjusted under 35 U.S.C. 154(b) by 969 days.

(21) Appl. No.: 11/719,830

(22) PCT Filed: Sep. 5, 2005

(86) PCT No.: PCT/NL2005/000638
§ 371 (c)(1),
(2), (4) Date: Mar. 17, 2009

(87) PCT Pub. No.: WO2006/057553
PCT Pub. Date: Jun. 1, 2006

(65) Prior Publication Data
US 2009/0193626 A1 Aug. 6, 2009

Related U.S. Application Data

(60) Provisional application No. 60/630,441, filed on Nov. 23, 2004.

(51) Int. Cl.
*A47J 45/07* (2006.01)
(52) U.S. Cl. .......... 16/425; 16/110.1; 16/111.1; 16/406; 16/422
(58) Field of Classification Search ................. 16/110.1, 16/111.1, 406, 422, 425, 430, DIG. 41; 220/759, 220/769; 294/30, 31.1, 34; 81/165, 170
See application file for complete search history.

(56) References Cited

U.S. PATENT DOCUMENTS

| 960,070 A | * | 5/1910 | Brown | 81/331 |
| 1,453,543 A | * | 5/1923 | Bonser | 294/31.1 |
| 3,422,485 A | * | 1/1969 | Pryce | 16/422 |
| 3,474,486 A | | 10/1969 | Morris et al. | |
| 5,704,092 A | | 1/1998 | Nicollet et al. | |
| 6,318,776 B1 | | 11/2001 | Lee | |
| 6,439,420 B1 | | 8/2002 | Park | |
| 6,910,248 B2 | | 6/2005 | Fiocco | |
| 7,478,735 B2 | * | 1/2009 | Lorthioir et al. | 220/759 |
| 7,883,129 B2 | * | 2/2011 | Jung et al. | 294/34 |
| 2002/0179618 A1 | * | 12/2002 | Dodane | 220/759 |
| 2006/0081136 A1 | | 4/2006 | Lorthioir et al. | |
| 2011/0005037 A1 | * | 1/2011 | Kim | 16/422 |

FOREIGN PATENT DOCUMENTS

| EP | 0769263 A | 4/1997 |
| JP | 2002 017581 A | 1/2002 |
| WO | 02/30254 | 4/2002 |
| WO | WO 02/30254 A | 4/2002 |
| WO | 2004/010832 | 2/2004 |
| WO | 2004/014207 | 2/2004 |
| WO | WO 2004/010831 A | 2/2004 |

OTHER PUBLICATIONS

International Search Report for PCT/NL2005/000638 dated Nov. 18, 2005.

* cited by examiner

*Primary Examiner* — Roberta Delisle
(74) *Attorney, Agent, or Firm* — McDonnell Boehnen Hulbert & Berghoff

(57) ABSTRACT

The invention relates to a detachable handle to hold a wall element (3) comprising a main body; a clamping arrangement connected to the main body; an operating member (30) mounted for pivoting on the main body and adapted to move the clamping arrangement between a free, non-clamping state and a clamping state in which the clamping arrangement clamps the wall element (3); and a transmission arrangement adapted to move the clamping arrangement when the operating member is pivoted, wherein the transmission arrangement comprises a transmission element (39) having an axis of rotation in longitudinal direction, and wherein the transmission arrangement is adapted to convert a pivoting movement of the operating member (30) into a rotational movement of the transmission element (39).

14 Claims, 4 Drawing Sheets

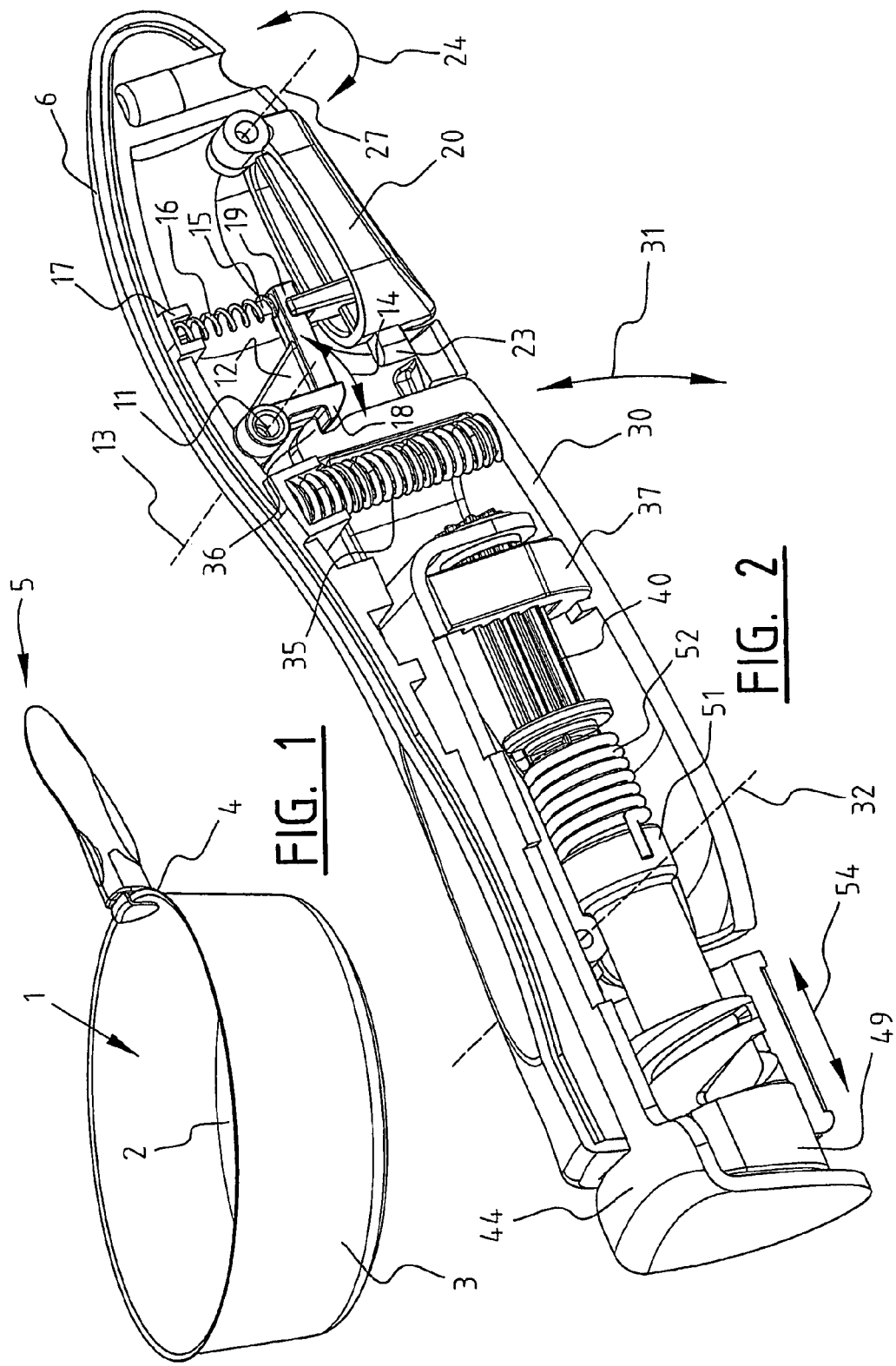

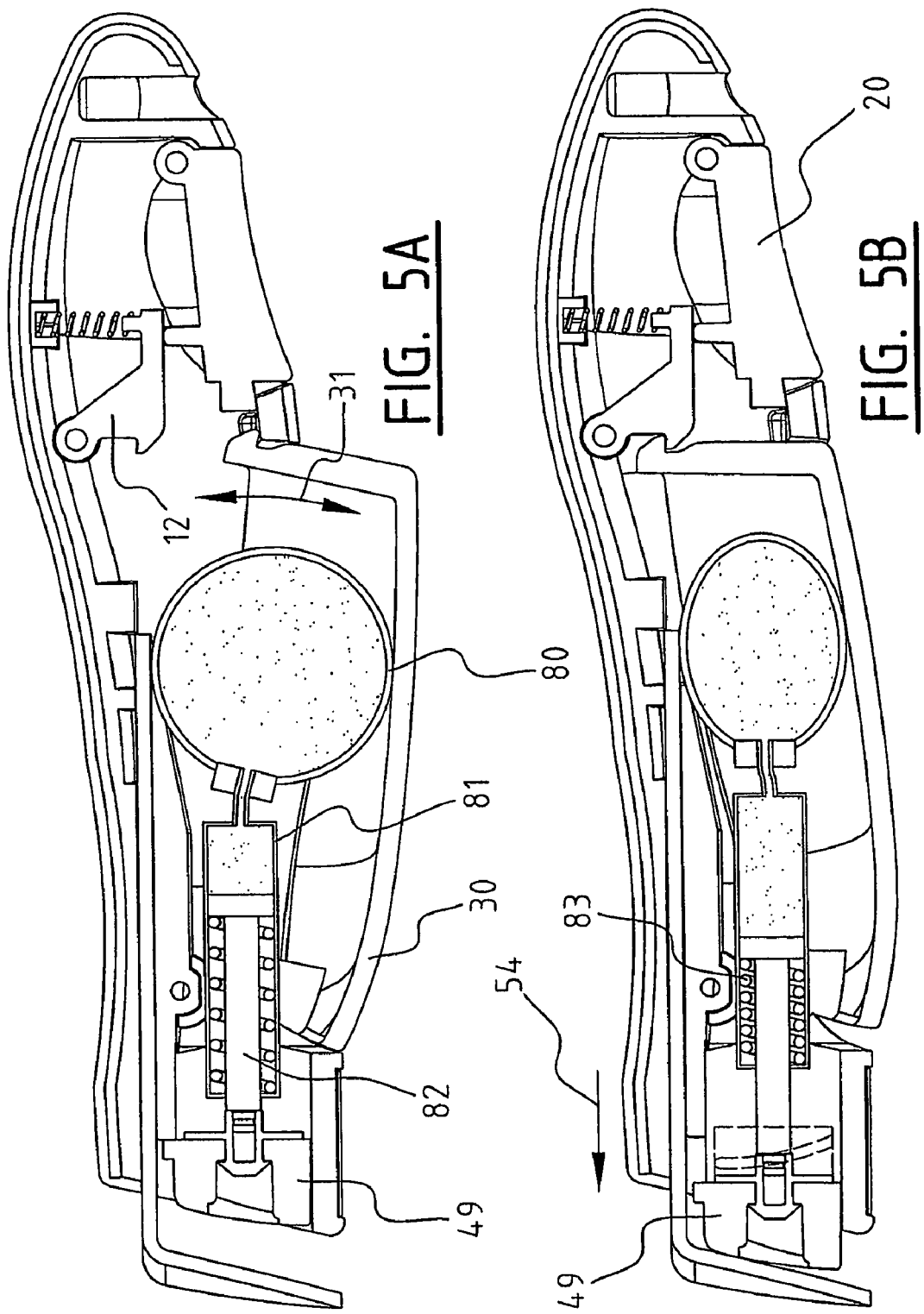

DETACHABLE HANDLE

The present invention relates to a detachable handle according to claim 1.

EP-B-0 769 263 describes a detachable handle according to the preamble of claim 1. The detachable handle comprises two clamp members which form together a clamp and which are mounted on a gripper body. A lever is provided to move the clamp members relatively to one another between an open position and a closed position in which the clamp members clamp the wall of a pan. The operating lever is mounted for pivoting on the gripper body. One of the clamp members is movable in translation with respect to the other clamp member which is integrally connected to the gripper body. A strip forming link extending between the lever and the movable clamp member is adapted to move the movable clamp member in translation when the lever is pivoted.

Other detachable handles are described in U.S. Pat. No. 6,318,776, EP-B-1 326 517, WO 2004/010831, WO 2004/010832 and WO 2004/014207.

The present invention aims to provide a detachable handle including an improved transmission arrangement.

For this purpose a detachable handle according to claim 1 is provided.

According to an exemplary embodiment of the present invention, a detachable handle is provided to securely hold and lock a wall element, which may be part of, for example, a pan, a pot or any other apparatus requiring a handle, including, for example, the apparatuses described in the above references. In this regard, the detachable handle may accommodate to wall elements of varying size or thickness.

According to an exemplary embodiment of the present invention, the detachable handle is provided with an advanced transmission arrangement to convert a movement of the handle into a clamping movement for clamping the handle to the wall element.

According to an exemplary embodiment of the present invention, the detachable handle may reduce the costs of production.

According to an exemplary embodiment of the present invention, the detachable handle includes a main body that is provided, for example, with a grip for gripping the handle with a hand of a user, and a operating member that is moveable with respect to the body. The operating member may include, for example, an element that is moved in and out the body, e.g. a lever, and may be at least partially received in the body. The operating member may be gripped by hand and moved by a squeezing force of the user. The operating member may include, for example, a first arm, that may be mounted rotatably to the body, in which a rotating joint may be used.

With the operating member, such as a lever, a clamping arrangement may be controlled to engage on the wall element to which the handle is to be attached. When the operating member is moved in a direction towards the main body of the detachable handle, the clamping arrangement may be brought from a free, non-clamping state to a clamping state.

The clamping arrangement may include two elements, which may be brought together with the wall element arranged in between the two elements when clamping the wall element. At least one of the elements may be moveable with respect to main body of the detachable handle.

A transmission arrangement may couple the operating member to the clamping arrangement for gripping, clamping and/or locking a wall element of a pan. The transmission arrangement may be embodied in many different configurations.

According to an exemplary embodiment of the present invention, the detachable handle is provided with a transmission element, that is movable in the longitudinal direction of the detachable handle, having an axis of rotation in the longitudinal direction. If the transmission element is rotatable, its movement in the longitudinal direction to clamp the wall element may be guided to provide control in a manner unlike other prior systems.

The transmission element may be connected to or may include at least a part of the clamping arrangement for clamping the wall element. The clamping arrangement may be actuated by movement of the transmission element, which may be mounted moveable within the main body of the detachable handle. In this regard, the transmission element may be moveable in a longitudinal direction of the main body.

A guide arrangement may be provided to guide the transmission element in a longitudinal direction, at least partially within the main body of the detachable handle. The guide arrangement may be embodied, for example, by suitable rails or a bearing. The guide arrangement may be suited for moving the transmission element relative to the main body.

According to an exemplary embodiment of the present invention, the transmission element, which may be part of the transmission arrangement between the operating member and the clamping arrangement of the detachable handle, includes at least a part that is rotatably mounted within the main body. In this regard, bearings may be provided to enable and/or facilitate the rotation.

According to an exemplary embodiment, the detachable handle includes a guide arrangement to guide the transmission element in a translating direction with respect to the main body, by transferring the rotational movement into the translation movement.

The transmission element may be provided with a groove, and a housing part of the detachable handle may be provided with a projection, or vice versa, in which the groove and the projection cooperate in guiding a longitudinal and rotational movement of the transmission element. The groove may be at least partially circumferential, and may be similar to a screw thread having an acute angle with a longitudinal direction. The angle may be variable so that the longitudinal movement may be prescribed as a function of the rotational movement and thereby enable a more controlled movement.

The transmission element may include a torsion element to allow the longitudinal movement to be adapted to variances in the wall thickness of the clamped wall element.

To use the detachable handle, a user may grip the handle and place an opening for gripping the wall element over the edge of the wall element. Elements of the clamping arrangement may now be placed on opposite sides of the wall element and may be moved towards each other in order to clamp the wall element. In this regard, the thickness of the wall element need not be known or measured, since the detachable handle may clamp wall elements of different sizes.

When using the detachable handle, the user may actuate the operating member, for example, by moving a lever with respect to the main body of the handle. The movement of the operating member may be converted into a translational movement of at least one of the elements of the clamping arrangement, so that the wall element is clamped in between the elements of the clamping arrangement. The clamping arrangement may be connected to a transmission element that may be moved, for example, in a longitudinal direction with respect to the detachable handle. A suitable guide arrangement for such a translational movement may be mounted in the detachable handle for the transmission element.

A transmission arrangement may couple the operating member with the transmission element. The movement of the operating member may be converted into a rotational movement around a first axis, including, for example, a longitudinal axis of the transmission element. The transmission element may be rotatably moveable with respect to the main body. The rotational movement may be converted into a translational movement with respect to the main body. When the transmission element is provided with a screw thread-like groove, the rotational movement may be converted to a translational movement.

The detachable handle may include a locking mechanism to lock the clamping arrangement in a position in which the wall element is clamped. According to an exemplary embodiment, the operating member may be locked.

The operating member may be coupled to a rotatable transmission element. An exemplary embodiment is shown in the figures but different mechanisms may be provided for the coupling.

According to an exemplary embodiment, the transmission element provides a clamping end, which locks the wall element. In this regard, the clamping end may cooperate with a fixed element of the body. Moreover, the clamping end may be essentially non-rotatable to ensure that the wall element is gripped by a non-rotating element. If the element was permitted to rotate, friction may be created affecting the functionality of the detachable handle. A closing die may be used to clamp the wall element, and a bearing may be received in the closing die for the rotating transmission element of the transmission arrangement.

To produce the detachable handle, the second element which includes a rotatable element, may be first assembled and then received in the main body of the detachable handle.

According to another aspect, the detachable handle includes a operating element, a first transmission arrangement for converting a movement of the operating member in a rotational movement and a second transmission arrangement for converting a rotational movement to a longitudinal movement of a clamping element in the detachable handle.

FIG. 1 shows a perspective view of a detachable handle according an exemplary embodiment of the present invention.

FIG. 2 shows a partially sectional view of the detachable handle according to a first exemplary embodiment.

FIGS. 5A-5B show a second exemplary embodiment of the detachable handle.

Figure 3:
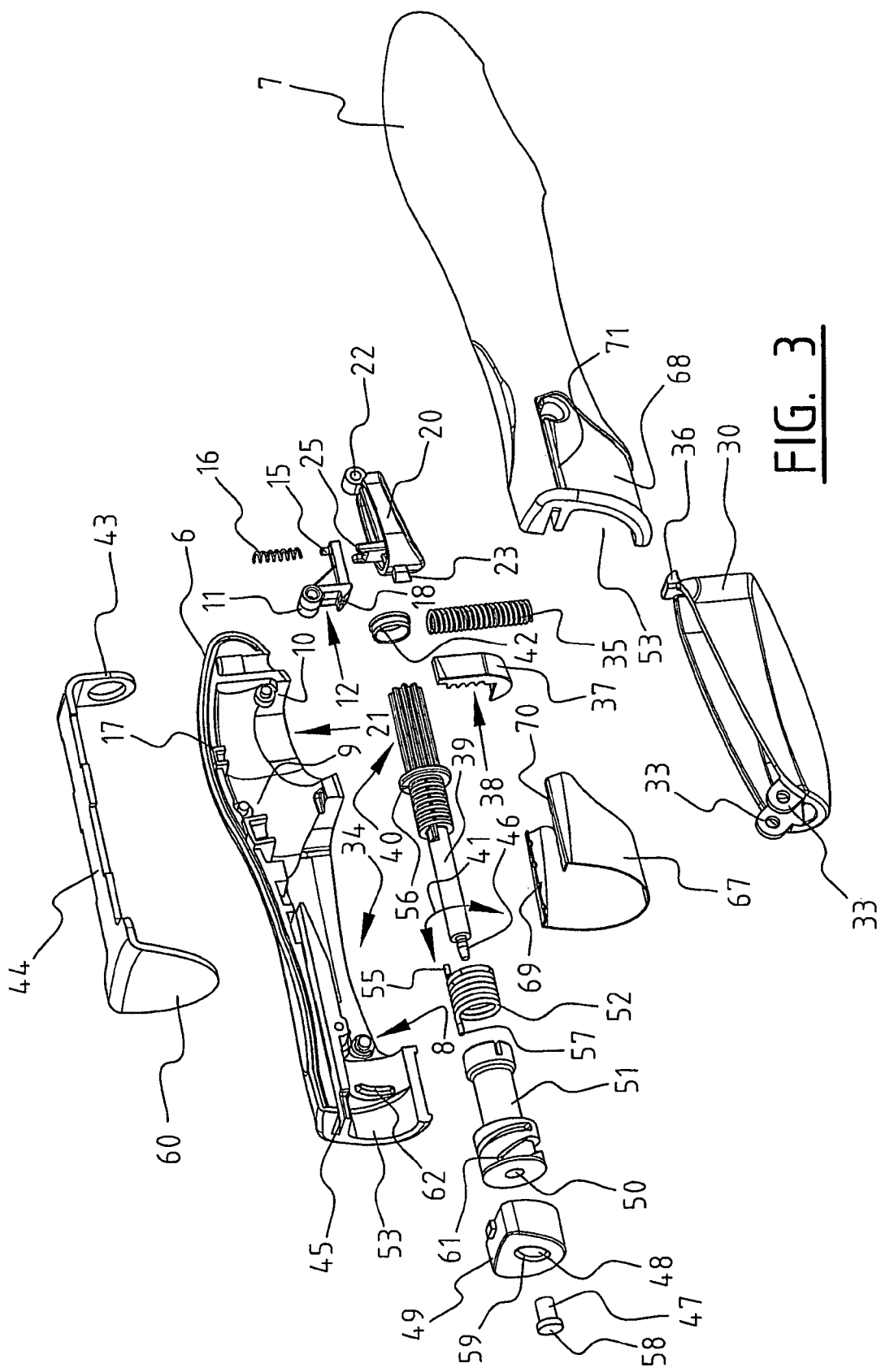
FIG. 3 shows an overview of the detachable handle according to the first exemplary embodiment.

FIG. 1 shows a perspective view of a pan 1 with a bottom 2 and an upstanding wall member 3. The upstanding wall member is cylindrical. At the upward end of the wall element 3 an edge 4 is provided extending partially outward from the wall element 3. The edge 4 and part of the wall element 3 may be gripped by a detachable handle 5 as shown in FIG. 1.

A detachable handle according to an exemplary embodiment of the invention is now discussed with reference to FIGS. 2 and 3. Like parts are referred to with the same numerals.

A detachable handle includes a housing, which includes a left housing part 6 and a right housing part 7. The housing parts 6,7 may be formed, for example, by injection molding, and may include a plastic material. The housing parts 6,7 may be combined to form the complete housing, in which an open space is created in between the housing parts to receive constructional elements of the detachable handle. These elements are shown in FIG. 3 individually and in FIG. 2 in an assembled manner.

Housing part 6 is provided with pins 8, 9 and 10, which are adapted to be received in a bore in order to form an axis of a rotational joint. Pins 9 and 10 each have a complementary pin on housing part 7. Pin 9 is received in bore 11 of trigger lock element 12. The trigger lock 12 may rotate according to arrow 14 around axis 13, which is formed by the pin 9. The trigger lock 12 is received in between the housing parts 6,7.

The trigger lock 12 includes a substantially L-form. Bore 11 is formed on one end of the L, whereas a pin 15 is formed standing upward from the other end 19. A spring 16 is received with its one end in bore 17, which is formed in both housing parts 6,7, and the other end of the spring 16 surrounds the pin 15. Spring 16 biases the lock trigger 12 in a position as indicated in FIG. 2. The hook-like part 18 extends forward (seen in the direction of the handle) of the trigger lock 12. The spring 16 forces the leg 19 of the trigger lock 12 towards the release button 20.

The release button 20 is received in the space 21, between the housing parts 6 and 7. One end of the release button 20 includes a bore 22, which forms an axis of rotation together with pin 10 in the respective housing part.

The release button 20 also includes a projection 23, which is positioned within the housing parts 6,7 to prevent the release button 20 from rotating according to arrow 24 around axis 27 in counterclockwise direction to a further than horizontal position. In the situation as shown in FIG. 2, hook 23 rests on the housing part 6. The release button 20 is pushed in this initial position by the spring 16, which forces the leg 19 to rest on extension 25, which extends in a substantially vertical direction in the assembled handle 5.

When in use, a force may be applied by a user in an upward direction to move the release button 20 around axis 27 in clockwise direction. This, in turn, leads to a rotation around axis 13 in counterclockwise direction of the trigger lock 12. The hook 18 is also rotated thereby releasing the trigger 30 from the lock position as shown in FIG. 2. This will be described in more detail hereunder.

Trigger 30 includes an ejection-molded handle that may be gripped by a user. In this regard, the user may grip the trigger 30, for example, with three fingers, so that the user's little finger is free to trigger the release button 20. The trigger 30 is provided with bores 33 to receive the pins 8 of the respective housing parts 6,7. The pins 8 form an axis 32 around which trigger 30 may rotate according to arrow 31. FIG. 2 shows the trigger 30 in a locked position received almost completely in the body of the detachable handle. The trigger 30 is received in the space 34 formed in between the handle parts 6,7.

A spring 35 is compressed in the locked state according to FIG. 2. If a user releases the trigger 30 using the release button 20, pushing that button upwards and releasing the hook-like engagement of hook 18 and hook 36 formed on trigger 30, the spring 35 releases the trigger 30 and moves it an outward manner with respect the housing parts 6,7 around axis 32 according to arrow 31. A user may grip the trigger 30 using muscle power and pushing it back to the locked position according to FIG. 2. The force for compressing the spring 35 has to be overcome by the user. If the hook 36 is pushed beyond the hook 18, the trigger will be locked again. Hook 18 may move according to arrow 14 when the hook 36 is moved upward. Both hook 18 and hook 36 are provided with a sliding edge in order to facilitate movement of locking trigger 12 when the trigger 30 is moved in the locked position.

Trigger 30 is provided with a cammed element 37. In this exemplary embodiment, the trigger 30 and cammed element 37 are two separate elements. However, both elements may be formed as one part in the injecting molding.

If trigger 30 is moved according to arrow 31, the cam or rack 37 moves in the same direction. The cammed part 38 engages on the axle element 39.

Axle element 39 according to this exemplary embodiment is provided with a cammed circumferential profile 40 on one end. If the cammed part 38 is moved according to arrow 31, the axle or toothed wheel 39 rotates according to arrow 41. The axis of rotation 41 is in a longitudinal direction of the detachable handle 5 according to this exemplary embodiment.

Axle element 39 is received in the housing and both ends of the axle element 39 are engaged by respective bearings. The cammed surface 40 is provided with a bearing 42 in the form of a plastic ring, which surrounds the cammed surface 40. The ring 42 is received in an opening 43 of a metal grip part 44, which is also received in the house part 6,7. The ring 42 has two edges that extend radially.

Housing parts 6,7 are provided with a groove 45 to receive the basis of the U-formed metal grip 44. This is shown in FIG. 2. The axle element 39 may rotate in the opening 43 of the metal grip 44. The other end of the axle element 39 is provided with a pin 46, which is received in a plug 47. The plug and pin assembly allows the axle element 39 to rotate in opening 48 of a closing die 49. Pin 46 of axle element 39 extends through the opening 50 in locker house 51. A torsion spring 52 surrounds the axle element 39. Closing die 49 is received in space 53 near the mouth of the housing parts 6,7. The housing parts 6,7 form a bearing for a longitudinal movement of the closing die 49 according to arrow 54. This longitudinal movement according to arrow 54 is described next.

When assembling the detachable handle, first the torsion spring 52 is connected to the axle element 39 on one end. The end 55 is received in an opening 56 which is provided in a disc-formed element extending radially from the axis of the axle element 39. The other end 57 of the torsion spring 52 is connected to the locker house 51. The pin 46 will extend out of the opening 50. The closing die 49 is placed over the free end of the locker house 51 and the plug 47 is connected to the pin 46 extending through the opening 48.

Plug 47 has a flange 58 extending radially, which becomes adjacent to edge 59 of opening 48 in the assembled state. The plug 47 prevents the removing of closing die 49 if assembled. Plug 47 may rotate freely, or pin 46 is received in plug 47 and may rotate freely. The axle element 39 may rotate relative to closing die 49.

The assembled unit including the axle element 39 is provided with the ring 42. The entire unit is received between the legs of the U-formed metal grip 44. Ring 42 is received in the opening 43. The closing die 49 will be adjacent to leg 60 of the U-formed metal grip 40

The mentioned assembled unit of metal grip 44 with axle element 39 may be placed in the housing part 6 by receiving the basis of metal grip 44 in groove 45 and receiving the closing die 49 in space 53. During such assembly, the preformed groove 61 in locker house 51 cooperates with housing part 6 so that it receives the projection 62. Projection 62 is formed at the inner side of house 6 extending partially radially around a longitudinal axis of the house 6. Protection 62 and groove 61 cooperate to guide the movement of the axle element assembly.

Figure 4A:
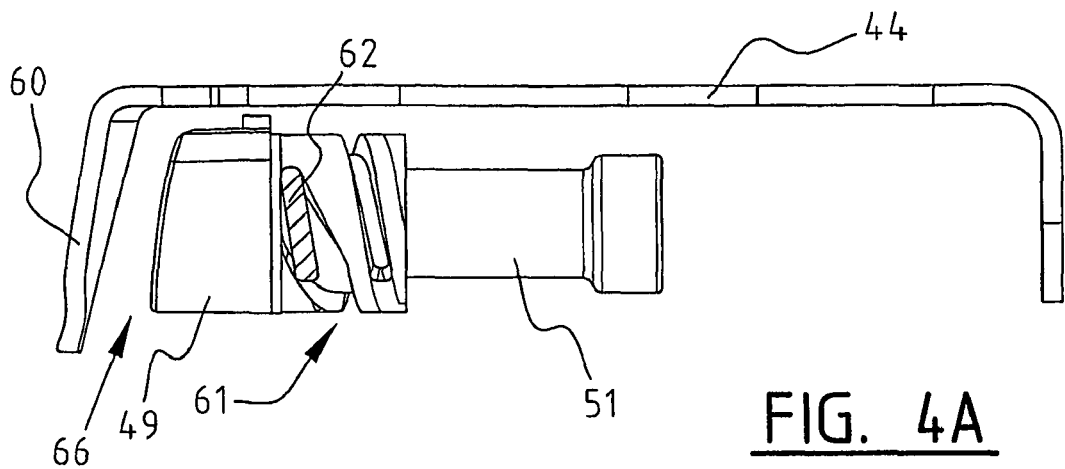
FIGS. 4A-4C show exemplary stages of the detachable handle when in use.
Figure 4B:
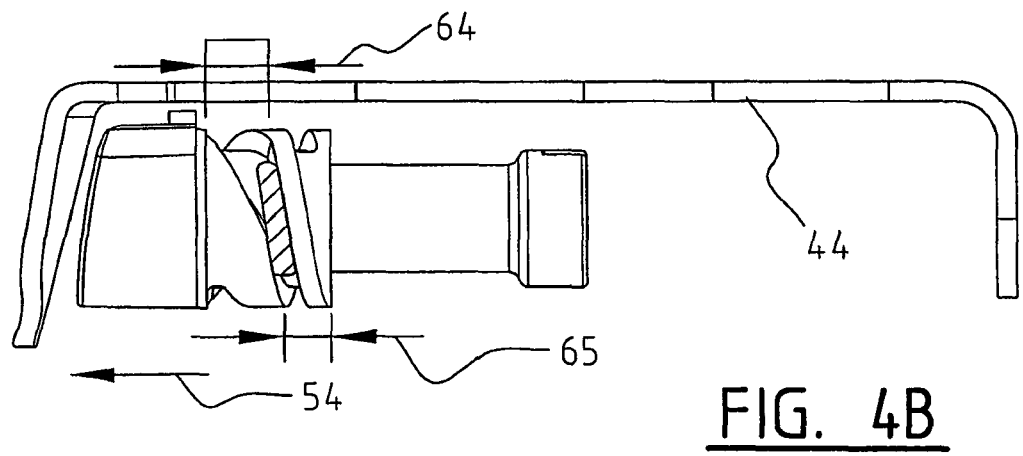
Figure 4C:
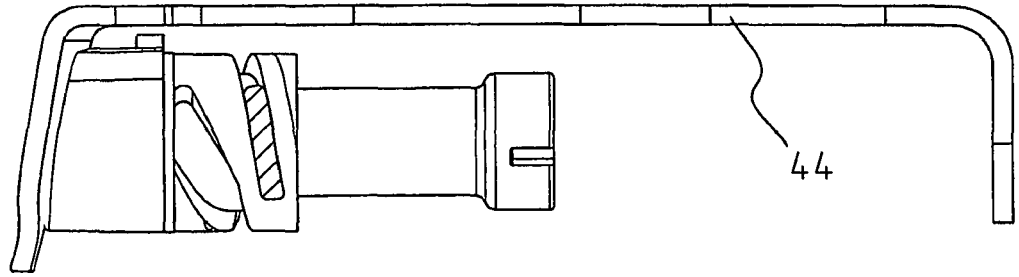

FIGS. 4A-4C show a detail of the detachable handle with the metal grip 44, locker house 51 and closing die 49. Projection 62 is shown shaded. By closing the trigger 30 according to arrow 31 towards the locked position as shown in FIG. 2, cammed element 37 will rotate axle element 39. The disk-formed element on the axle element 39 is connected to the torsion spring 52, which in turn is connected to the locker house 51. The rotational movement according to 41 is transferred to the locker house 51. If rotated, projection 62 guides the rotation of the locker house 51. This is shown in FIG. 4A-4C.

Groove 61 has a first part 64 and a second part 65. The first part 64 has a groove, which has an angle that is less sheer with respect to the axis of movement 54 than the angle of the second part 65. If rotated, locker house 51 is moved forward according to arrow 54 guided by perfection 62, and groove 61. During the first rotation, the movement according to arrow 54 is greater than during the second rotation as shown in FIGS. 4A-4B and FIGS. 4B-4C, respectively.

Wall element 3 and edge 4 according to FIG. 1 is received in space 66 in between leg 60 and closing die 49. By the rotational movement according to arrow 41, the space 66 is decreased.

The thickness of wall element 3 may be varied and the space 66 may be decreased accordingly. If a thick wall element is placed between leg 60 and closing die 49, the locker house 51 cannot be moved to a position shown in FIG. 4C. Projection 62 will not reach an end position in the groove 61. Instead protection 62 will be held in a position in between that which is shown in FIGS. 4B and 4C, and part of the movement according to arrow 54 is "absorbed" by the torsion spring 52.

An assembly as described above, uses a mechanism to convert a movement of the operating member/trigger 30 according to arrow 31 into a rotational movement according to arrow 41 into an effective longitudinal movement according to arrow 54. The torsion spring forms an adaptation arrangement for the longitudinal movement. The movement in the longitudinal direction is adapted, if properties of the gripped pan 1 forces the detachable handle 5 to do so. The torsion spring 52 decreases the longitudinal movement by decreasing the rotational movement according to arrow 41.

With the sheer angle of the groove 61 in part 65, a relative large force in the longitudinal direction according to arrow 54 may be required to change the space 66 between the metal part and the closing die 49. By doing so, the detachable handle 5 according to an exemplary embodiment of the present invention, secures the gripping of the pan 1. Such control may be provided because of the rotational movement.

After assembling the metal grip arrangement as described above, the trigger lock 12 arrangement and the release button 20 may be assembled in a straight-forward manner as described above. cam element 37 may then be placed gripping the circumferential cam surface 40 and trigger 30 including spring 35 may be assembled. Thereafter, the two house parts 6,7 are put together, which are held together by a flame guard 67 which is received on the outer part of the housing parts 6,7. In the exemplary embodiment shown, a space 68 is provided to receive the flame guard 67. In the assembled state, flame guard 67 covers the housing parts 6,7 and protects the housing parts from flames and/or fires. On top of that, screws for connecting the two house parts are covered by the flame guard. On the outer ends of U-formed flame guard 67 edges 69,70 are provided which are received in grooves 71 in the outer side 6,7.

FIGS. 5A-5B show a second exemplary embodiment of the present invention. Trigger 30 is shown in FIG. 5A in the unlocked state and in the locked state in FIG. 5B. Closing die 49 is shown in the non-clamping and clamping position respectively.

According to the second exemplary embodiment, a balloon 80 is filled with a fluid, and the balloon 80 is compressed if trigger 30 is moved according to arrow 31 as shown in FIGS.

6A-6B. The balloon 80 is connected to a cylinder 81. In this regard, the connection is an open connection. In cylinder 81 a piston 82 is received connected to the closing die 49. If the trigger is moved to the locked position as indicated in FIG. 5A, closing die 49 is moved according to arrow 54. Since a compressible gas is moved from balloon 80 to cylinder 81, piston 82 is moved according to arrow 54. Piston 82 is pre-stressed by a spring 83. The locker house is provided with a groove cooperating with a projection provided on the housing of the handle.

According to another exemplary embodiment, piston 82 may be connected to closing die 49 through another spring to further facilitate the variances in the wall thickness of a wall element 3 of a pan 1, which may be adapted to with the detachable handle according to the invention.

According to another exemplary embodiment, the torsion spring 52 according to FIG. 1 may be replaced by another torsion element, including, for example, an element capable of twisting. In a further exemplary embodiment, locker house 51 and torsion spring 52 may be both replaced by a locker house having an axis that is twisted.

The invention claimed is:

1. A detachable handle to hold a wall element comprising:
a main body;
a clamping arrangement connected to the main body;
an operating member mounted for pivoting on the main body and adapted to move the clamping arrangement between a free, non-clamping state and a clamping state in which the clamping arrangement clamps the wall element;
a transmission arrangement adapted to move the clamping arrangement when the operating member is pivoted, characterized in that the transmission arrangement comprises a transmission element having an axis of rotation in a longitudinal direction, wherein the transmission arrangement is adapted to convert a pivoting movement of the operating member into a rotational movement of the transmission element;
wherein the transmission arrangement is adapted to convert the rotational movement of the transmission element into a translation movement of the clamping arrangement; and
wherein a helical groove and a projection cooperating therewith are arranged between the main body and the transmission element.

2. The detachable handle according to claim 1, wherein a toothed wheel and a rack cooperating therewith are arranged between the operating member and the transmission element.

3. The detachable handle according to claim 1, wherein the transmission arrangement comprises a torsion element.

4. The detachable handle according to claim 1, wherein the clamping arrangement comprises two elements, at least one of which is moveable in translation with respect to the main body.

5. The detachable handle according to claim 4, wherein the moveable element of the clamping arrangement is non-rotatably connected with the transmission element.

6. The detachable handle according to claim 1, wherein the operating member comprises a lever being pivotable between an extended position and a position retracted inside the main body between the non-clamping state and the clamping state of the clamping arrangement.

7. The detachable handle according to claim 6, wherein the locking arrangement is adapted to lock the lever in its retracted position.

8. The detachable handle according to claim 1, further comprising a locking arrangement adapted for locking the clamping arrangement in its clamping state.

9. The detachable handle according to claim 7, further comprising a release element operable from the same side as the operating member for releasing the locking arrangement for the clamping arrangement.

10. The detachable handle of claim 7, further comprising a release element operable for releasing the locking arrangement for the clamping arrangement.

11. A detachable handle to hold a wall element comprising:
a main body;
a clamping arrangement connected to the main body;
an operating member mounted for pivoting on the main body and adapted to move the clamping arrangement between a free, non-clamping state and a clamping state in which the clamping arrangement clamps the wall element;
a transmission arrangement adapted to move the clamping arrangement when the operating member is pivoted, characterized in that the transmission arrangement comprises a transmission element having an axis of rotation in a longitudinal direction, wherein the transmission arrangement is adapted to convert a pivoting movement of the operating member into a rotational movement of the transmission element;
wherein the transmission arrangement is adapted to convert the rotational movement of the transmission element into a translation movement of the clamping arrangement; and
an adaptation arrangement for absorbing longitudinal movement of the clamping arrangement.

12. The detachable handle of claim 11, wherein the adaptation arrangement comprises a torsion spring.

13. A detachable handle to hold a wall element comprising:
a main body;
a clamping arrangement connected to the main body;
an operating member mounted for pivoting on the main body and adapted to move the clamping arrangement between a free, non-clamping state and a clamping state in which the clamping arrangement clamps the wall element;
a transmission arrangement adapted to move the clamping arrangement when the operating member is pivoted, characterized in that the transmission arrangement comprises a transmission element having an axis of rotation in a longitudinal direction, wherein the transmission arrangement is adapted to convert a pivoting movement of the operating member into a rotational movement of the transmission element;
a locking arrangement adapted for locking the clamping arrangement in its clamping state with the operation member engaging a first portion of a trigger element positioned within the main body; and
a release element operable for releasing the locking arrangement for the clamping arrangement by exerting a force on the release element that is in contact with a second portion of the trigger element.

14. The detachable handle of claim 13, wherein the release element is operable from the same side of the main body as the operating member for releasing the locking arrangement for the clamping arrangement.

* * * * *